No. 684,371. Patented Oct. 8, 1901.
A. A. HAMERSCHLAG.
MOTOR VEHICLE.
(Application filed Mar. 23, 1900.)
(No Model.) 5 Sheets—Sheet 1.

WITNESSES: INVENTOR
BY
ATTORNEYS

No. 684,371. Patented Oct. 8, 1901.
A. A. HAMERSCHLAG.
MOTOR VEHICLE.
(Application filed Mar. 23, 1900.)
(No Model.) 5 Sheets—Sheet 2.

No. 684,371. Patented Oct. 8, 1901.
A. A. HAMERSCHLAG.
MOTOR VEHICLE.
(Application filed Mar. 23, 1900.)

(No Model.) 5 Sheets—Sheet 3.

WITNESSES: INVENTOR

No. 684,371.  
A. A. HAMERSCHLAG.  
MOTOR VEHICLE.  
(Application filed Mar. 23, 1900.)  
(No Model.)

Patented Oct. 8, 1901.

5 Sheets—Sheet 4.

WITNESSES:  
F. Stallman  
P. F. Sonnek

INVENTOR  
Arthur A. Hamerschlag  
BY  
ATTORNEYS

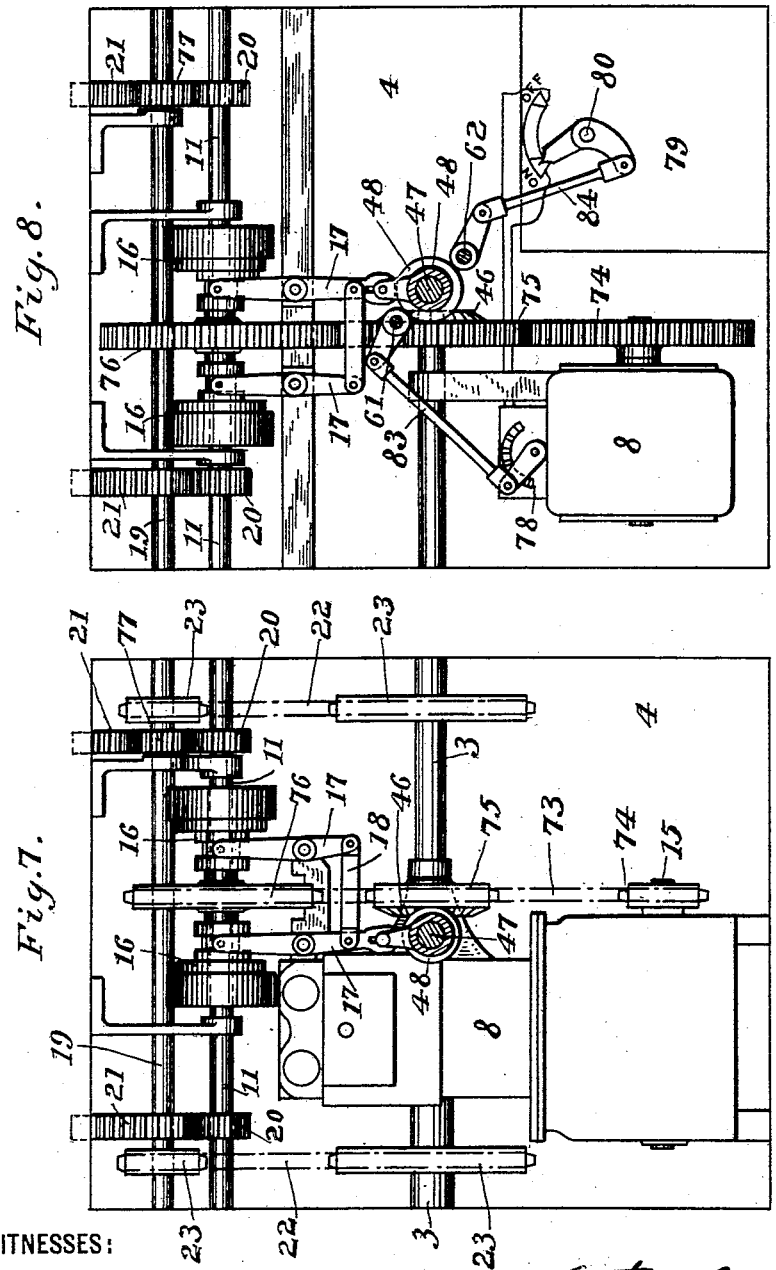

UNITED STATES PATENT OFFICE.

ARTHUR A. HAMERSCHLAG, OF NEW YORK, N. Y.

MOTOR-VEHICLE.

SPECIFICATION forming part of Letters Patent No. 684,371, dated October 8, 1901.

Application filed March 23, 1900. Serial No. 9,879. (No model.)

*To all whom it may concern:*

Be it known that I, ARTHUR A. HAMERSCHLAG, a citizen of the United States, residing in the city, county, and State of New York, have invented certain new and useful Improvements in Motor-Vehicles, of which the following is a specification.

This invention relates to improvements in motor-vehicles, and particularly to a traction-truck adapted to be substituted for or in place of the forward-wheel truck of an ordinary four-wheeled vehicle, so as to convert such vehicle into a self-propelling vehicle without making any other change in the vehicle itself.

The special objects of the present invention are to facilitate the attachment of the traction-truck to the vehicle, to minimize the amount of alteration required in the vehicle-body, and to provide for the operation, steering, and control of the traction-truck in a simple and advantageous manner.

Figure 1:
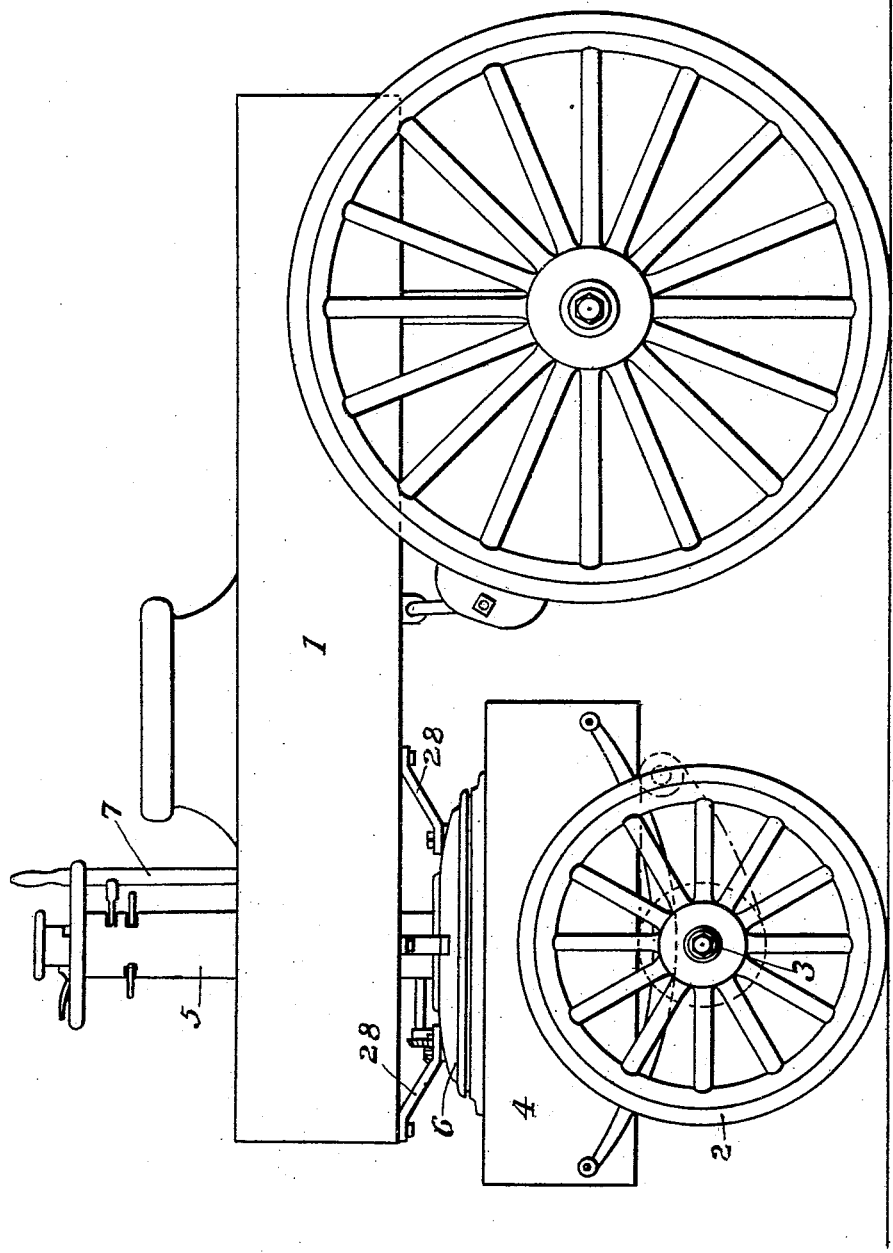
Figure 2:
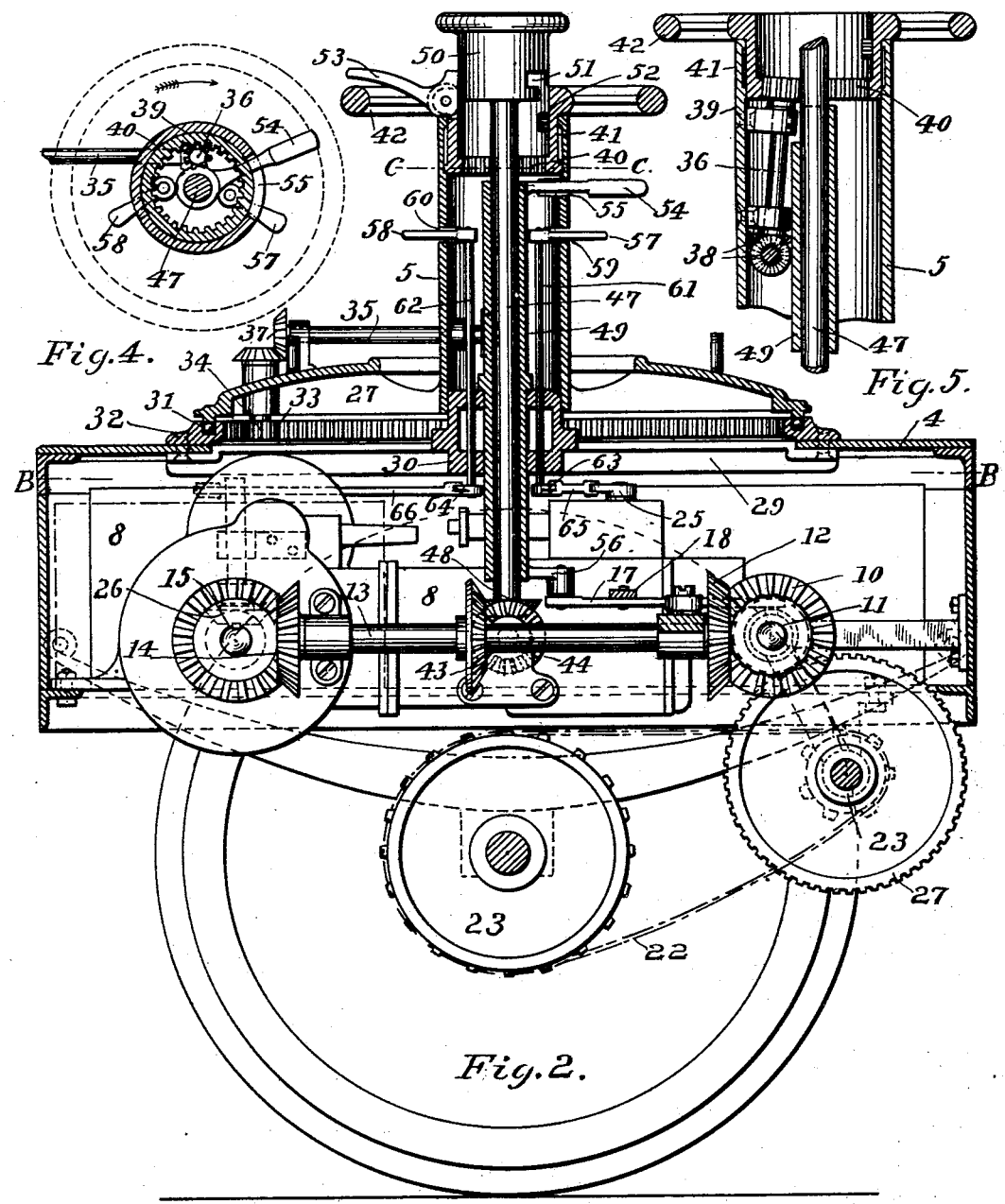
Figure 3:
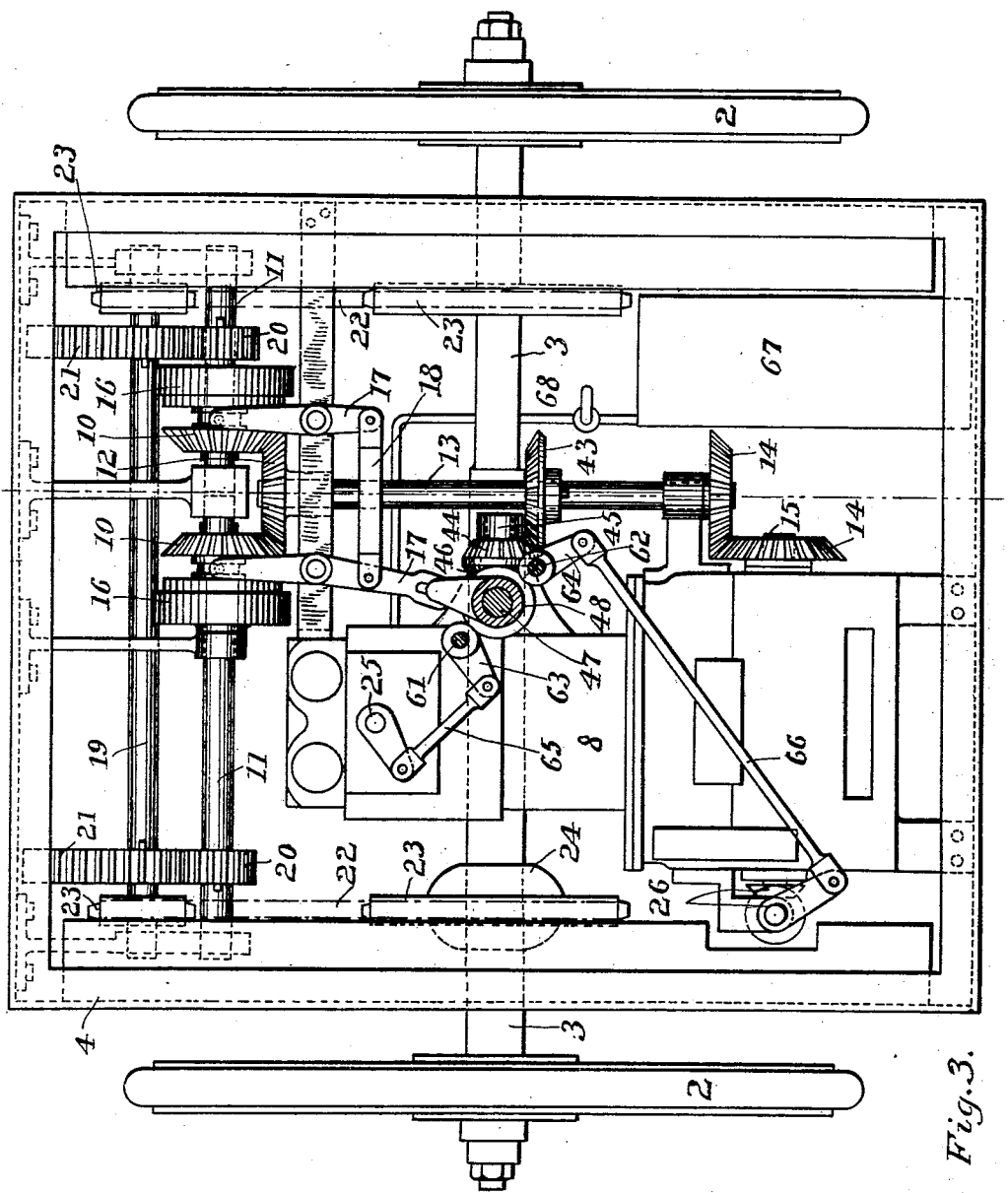
Figure 6:
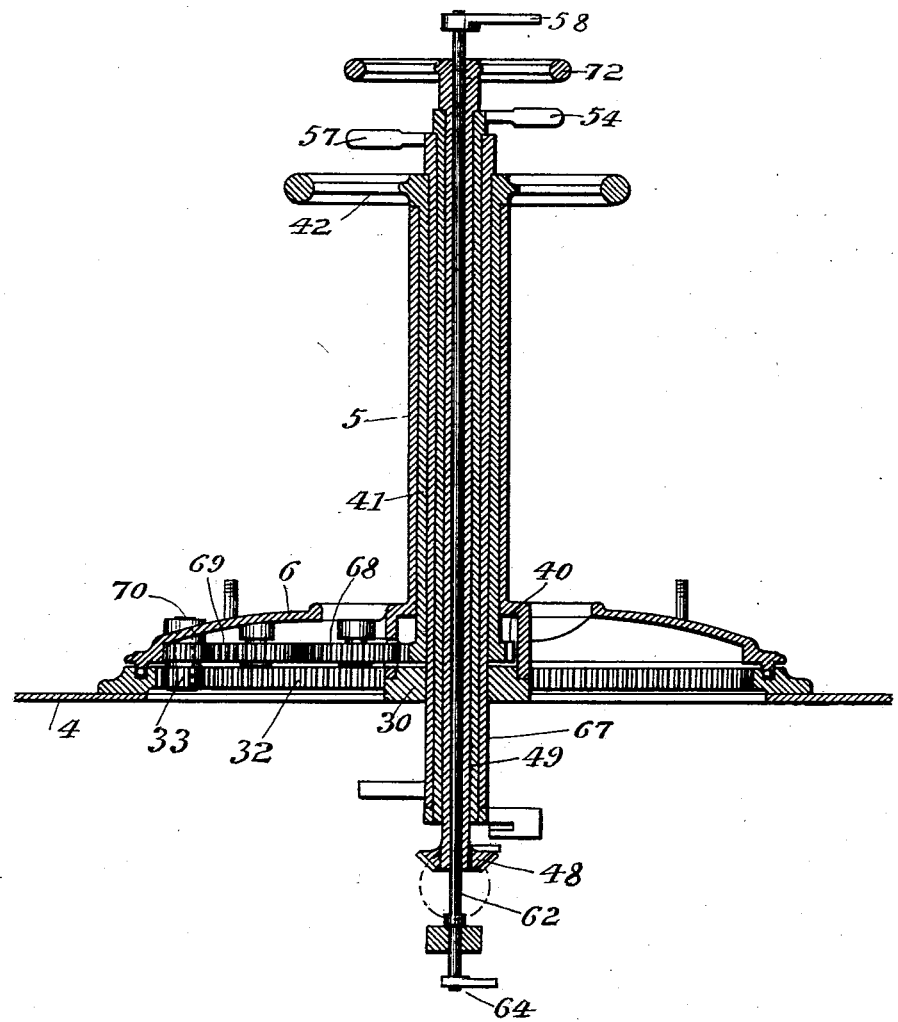

In the accompanying drawings, Figure 1 is a side elevation of a vehicle with my improved traction-truck applied thereto. Fig. 2 is a vertical section of the traction-truck on the line A A in Fig. 3. Fig. 3 is a horizontal section on the line B B in Fig. 2. Fig. 4 is a horizontal detail section on the line C C in Fig. 2, showing the actuating devices for the steering-gear. Fig. 5 is a vertical section of said actuating devices. Figs. 6 to 8 show modifications.

Referring to Fig. 1, the body or frame of a vehicle (represented at 1) is connected by a king-pin connection with the traction device forming the subject of the invention. The said traction device comprises traction-wheels 2 2, whose shafts 3 3 in Fig. 3 are journaled in suitable bearings in the frame 4 of the traction device. In the center of the traction device and extending upwardly is a tubular post or standard 5, which, together with a fifth-wheel plate 6, is attached to the body 1 of the vehicle and is adapted to turn on the frame of the traction device, said post 5 extending through an opening in the floor of the vehicle-body and into convenient proximity to the driver's seat. This post serves as the king-pin connection between the traction-truck frame 4 and the vehicle-body 1, and it also serves to contain the various steering and controlling instrumentalities, which at the upper part of this post are provided with manual actuating devices, while at their lower ends they are in mechanical connection with the several controlling and steering devices on the truck. All the controlling and steering connections between the vehicle and the traction-truck being located within this pivotal center post or king-pin connection, the disturbance of the floor of the vehicle is reduced to a minimum and the truck is enabled to swing entirely around on its center, giving the utmost freedom in steering and backing. The lever 7 in Fig. 1 is the usual hand-brake lever and has no connection with the traction-truck.

The traction-truck is shown more in detail in Figs. 2 to 5, wherein the motor 8 is shown as mounted on the frame 4 and connected by gearing with the truck-shafts 3 3. The motor here shown is a gas-engine of any suitable type, and in order to enable it to run continuously in the same direction while the vehicle is being run forward or backward I prefer to employ a reversing-gear, consisting, for example, of bevel-wheels 10 10, carried by counter-shafts 11' 11 and engaging on opposite sides of a bevel-gear 12 on a shaft 13, geared by bevel-wheels 14 14 to the main shaft 15 of the gas-engine. Friction-clutches 16 16, connected with the respective bevel-wheels 10 10, enable either one or the other of such bevel-wheels to be clutched to the corresponding shaft 11, according as the movable members of such clutches are thrown one way or the other longitudinally on said shaft. Such longitudinal movement of the clutches is effected by clutch-levers 17 17, connected together by link 18. Shafts 11 and a parallel shaft 19 are journaled in the frame 4 and carry gears 20 20 21 21, whereby the said shaft 19 is turned one way or the other, according to which shaft 11 is in operation, the above-described mechanism thus constituting a clutch-controlled reversing-gear. When the clutches are in an intermediate position, they are both disengaged and the gas-engine runs idle. The shaft 19 is connected by chains and sprocket-wheels 22 23 or otherwise to the shafts 3 3 of the respective traction-wheels, a differential gear being preferably interposed, as indicated at 24, in the connection to one of the truck-shafts to enable the vehicle to turn curves more readily and equalize the operation of the truck-wheels.

25 represents a spindle governing the admission of air and fuel, or of either of them, to the gas-motor in any suitable and usual manner, and 26 is a shiftable device controlling the point of ignition. In starting it is generally desirable to shift the point of ignition forward and then shift it back again after the engine is well started. Such valve mechanism and ignition-controlling devices being well known in the art they are not herein shown in detail.

The fifth-wheel plate 6, which is attached to the tubular king-pin post 5 by means of spokes or ribs 27, is secured to the bottom of the vehicle-body, as shown in Fig. 1, by means of suitable fastenings 28, so that said king-pin post and the fifth-wheel plate turn with the vehicle-body. The central part of the top of frame 4 is made in the form of an open frame or spider 29, carrying a central hub or journal-bearing 30, wherein the tubular king-post 5 turns, and the fifth-wheel plate 6 also bears on the top of frame 4 by a ball-bearing 31, this ball-bearing being made in the top of a ring 32, formed at the top of frame 4. The inner side of this ring 32 is toothed and serves as a steering-gear ring for the traction-truck. A pinion 33, engaging with this steering-gear ring, is connected by gearing, such as shafts 34 35 36 and bevel-wheels 37 38, (see Figs. 2, 4, and 5,) with a pinion 39, that engages with an internal gear-ring 40 on the collar or hub 41 of a hand-wheel or manual actuating device 42, mounted at the top of the tubular king-pin post 5, the said collar or hub 41 being adapted both to turn and to slide vertically in said tubular post, which serves as a journal-bearing and guide therefor. The hand-wheel 42 normally rests by gravity on the top edge of the tubular post 5, and in this position (shown in Fig. 2) the internal gear 40 is in engagement with the pinion 39, so that rotation of the hand-wheel will actuate the steering-gear connections 38 37 33 and turn the steering-gear ring 32 so as to turn the traction-truck relatively to the vehicle-body.

Starting mechanism for starting or "turning over" the motor by hand is also provided, the same comprising a bevel-gear 43 on the transmitting-shaft 13, above referred to, engaging with a bevel-gear 44, journaled on a stud and carrying a similar gear 46 rigidly attached to it. A starting rod or spindle 47 is mounted centrally in the tubular king-post and carries at its lower end a bevel-wheel 48, which engages with said bevel-gear 46. The rod 47 turns loosely in a tubular spindle 49, which is rotatably supported in the central hub or bearing 30, and said rod 47 carries at its upper end a head 50, provided with an offset slot 51, adapted to engage with a pin 52 on the inside of the hub of hand-wheel 42 when said hand-wheel is raised. By raising the hand-wheel 42 and turning it to the right the pin 52 is carried into the offset of slot 51, and the hand-wheel is thus locked in its raised position in engagement with the starting-rod and with its gear-ring 40 out of engagement with the steering mechanism. On then continuing to turn the hand-wheel the rod 47 and bevel-gears 46 45 44 43 transmit motion to the motor-gearing. A spring friction-pawl 53 prevents accidental displacement of the hand-wheel. After the engine has been started this pawl is released by its finger-piece and the hand-wheel is turned back and dropped to its lower position, thus bringing the steering-gear again into connection.

The sleeve or tubular spindle 49, surrounding the rod 47, carries at its upper end an actuating-handle 54, projecting through a slot 55 in the side of the tubular post 5, said tubular spindle 49 being provided at its lower end with an arm 56, engaging by a pin-and-slot connection with one of the clutch-operating levers 17, so that by moving the handle 54 sidewise in the slot 55 the reversing and disengaging clutches are thrown into or out of gear. Two other handles 57 58 are shown as projecting through the side of tubular post 5, through slots 59 60, said handles being mounted, respectively, on vertical rods 61 62, turning in the central hub 30 and carrying arms 63 64, connected by links 65 66, respectively, to the valve-controlling mechanism or device 25 and to the shiftable ignition-controlling device 26 of the gas-motor.

If any further controlling devices are used, such as change-gears or change-belt connections, they would according to my invention also be controlled by devices passing down through the central king-pin post 5.

The several handles and hand-wheels or manual actuating devices 42 50 54 57 58 are preferably made detachable from the parts they actuate, so that on removing them the vehicle-body, with the attached king-pin post and fifth-wheel plate, may be lifted bodily off the truck-frame 4, a reverse proceeding being carried out in assembling. The gasolene-reservoir 67 is also located in the truck-frame 4 and is connected by pipe 68 to the admission devices of the gas-motor. This location of the said reservoir also conduces to the ease of assembly and separation of the traction-truck and the vehicle-body.

The construction of the transmitting mechanism in the king-pin post for the starting-gear, steering-gear, &c., may be varied, as shown in Fig. 6, where all the said transmitting members are shown as concentrically-arranged sleeves or spindles working within the tubular post 5 and around the central rod 62, the latter in this case controlling the igniting mechanism. The sleeve 47, directly surrounding the said rod, carries at its lower end the bevel-gear 48 for starting the motor, and the successive sleeves 49 and 61 control, respectively, the clutch and the valve-gear.

The outermost sleeve or spindle 41 is formed as a downward extension of or is attached to the hand-wheel 42 and is provided at its lower end with gear-teeth 40, connected through idlers 68 69 with a pinion 70, pivoted in the fifth-wheel frame 6, and rigidly connected to the pinion 33, engaging in the steering-gear ring 32 on the traction-truck frame 4.

The several concentric spindles 62, 47, 49, 61, and 41 are respectively provided at their upper ends with handles or actuating devices 58, 72, 54, 57, and 42, arranged in descending order, so that each may be turned independently of the others.

Fig. 7 shows the application of chain-gearing carrying chain 73 and sprocket-wheels 74 75 76 in place of the bevel-wheels and shaft 13 for transmission from the motor to the clutch-shaft. In this case the reversal is effected by the interposition of an idler 77 on one side between the gears 20 21, so as to reverse the motor when the clutches 16 are on them to bring that side into operation. The starting bevel-gear 48 in this case engages bevel-gear 46, formed on the side of intermediate sprocket-wheel 75.

In Fig. 8 the transmitting connection from the motor to the clutches is by spur-gearing 74 75 76, the operation being otherwise the same as in Fig. 7, with the exception that the motor 8 is here shown as an electric motor provided with a regulating-rheostat 78 and a supply storage battery 79, with controlling-switch 80, said rheostat and switch being controlled, respectively, by levers 81 82, connected by links 83 84, respectively, to the operating-rods 61 62, located in and extending up through the tubular king-pin post above described. In this case, as in the others, the supply of operating medium for the motor is carried by the traction-frame itself, so that there is no necessity of sliding or extensible connections between the truck and the vehicle. I have shown starting and reversing mechanism in this case also, as the use of such devices in connection with an electric motor, while not absolutely necessary, is of advantage in that it enables the operator to save the storage battery from excessive load in starting and in reversing.

I claim—

1. A self-propelling traction device, adapted to be used as a traction-truck in connection with a vehicle, and comprising traction-wheels, a frame supported on said wheels, a motor carried by said frame, gearing, including reversing-gear, between said motor and the truck-wheels, starting-gear for the motor, a central hollow post adapted to serve as a king-pin for connecting the traction device to the vehicle, a hand-wheel mounted in said post, gearing and shaft connections located within the post and operated by said hand-wheel, a steering-gear on the truck engaged by the said gearing in the post, concentric shafts mounted axially within the post and connected at their lower ends respectively with the aforesaid reversing-gear and starting-gear.

2. A self-propelling traction device, adapted to be used as a traction-truck in connection with a vehicle, and comprising traction-wheels, a frame supported on said wheels, a motor carried by said frame, a hollow king-pin post on said truck-frame, having slots in its sides, shafts located within said post and having handles at their upper ends extending through the slots in the post, and devices on the truck, connected to said shafts and adapted for controlling and reversing the operation of the motor on the truck.

3. A self-propelling traction device adapted to be used as a traction-truck of a vehicle, and comprising traction-wheels, a frame supported by said wheels, a motor carried by said frame and geared to said wheels, a king-pin post mounted to turn on said frame, a manually-operated actuating device located in said king-pin post and shiftable vertically into different positions, and adapted to be rotated in either of such positions, a starting device for the motor adapted to be engaged and operated by said actuating device in one position thereof, and a steering-gear for controlling the position of the aforesaid frame and adapted to be engaged and operated by the said actuating device in the other position thereof.

4. A self-propelling traction device adapted to be used as a traction-truck of a vehicle, and comprising traction-wheels, a frame supported by said wheels, a motor carried by said frame and geared to said wheels, a king-pin post mounted to turn on said frame, a manually-operated actuating device located in said king-pin post and shiftable vertically into different positions, and adapted to be rotated in either of such positions, a starting device for the motor adapted to be engaged and operated by said actuating device in one position thereof, and a steering-gear for controlling the position of the aforesaid frame and adapted to be engaged and operated by the said actuating device in the other position thereof, and means for locking the said actuating device in either of its different positions.

ARTHUR A. HAMERSCHLAG.

Witnesses:
A. P. KNIGHT,
HARRY E. KNIGHT.